Nov. 17, 1959     A. C. RICHARDSON     2,913,343
PROCESS FOR THE PRODUCTION OF VINEGAR
Filed May 23, 1955

ALAN C. RICHARDSON
INVENTOR.

BY *Lyon & Lyon*

ATTORNEYS

2,913,343

PROCESS FOR THE PRODUCTION OF VINEGAR

Alan C. Richardson, Berkeley, Calif., assignor to California Packing Corporation, San Francisco, Calif., a corporation of New York Application May 23, 1955, Serial No. 510,476

2 Claims. (Cl. 99—147)

This invention relates to the production of vinegar and has particular reference to a process for the submerged aeration of alcoholic liquid media.

One of the principal objects of this invention is to provide a novel method for the submerged aeration of alcoholic liquids and alcoholic liquid media for production of vinegar.

As is well known, various alcohol-containing media such as wine or hard cider when inoculated with suitable strains of Acetobacter and allowed to stand for long periods with free access to air (while being maintained within suitable temperature limits for the growth of Acetobacter) will become acetified or converted to vinegar through the activity of the organisms growing on, or close to, the surface of the liquid.

Because of the time-consuming character of this simple operation, vinegar is produced commercially, in most instances, through the so-called "quick method" wherein a much larger area of surface growth is provided. This is accomplished by trickling the liquid to be acetified through a tall tank or column packed with porous, solid material on whose surface Acetobacter are permitted to grow. Suitable solids which are frequently used are hardwood shavings, corn cobs, lumps of pumice stone or coke. Such a column is known in the vinegar industry as a generator.

In use, the alcoholic liquid to be acetified is allowed to trickle over the packing and is withdrawn at the bottom and recirculated at such a rate that the packing is kept moist but not submerged, so that there is free access for air to pass upward through the interstices in the packing. In many of these devices the supply of fresh air is provided solely by convection currents induced by the metabolic heat released by the bacterial activity. This heat causes an up-draft which moves countercurrent to the descending liquid, causing the spent air to be exhausted at the top of the generator and fresh air to enter at the bottom.

In certain more modern installations, mechanical blowers are used to provide more rapid circulation and better temperature control. In these, some recirculation of the air may also be obtained if desired.

I have found that the conventional methods of aeration requiring various types of porous gas-dispersing units, when applied to acetification, work readily in small laboratory or pilot plant tanks, but their projection to large-scale operations involves certain physical difficulties which may well explain why the method has heretofore not been found practical when applied on a large scale to the manufacture of vinegar.

To achieve efficient vinegar production it is necessary to provide an ample supply of oxygen to the liquid substrate without passing air through the substrate at a rate which will cause excessive losses of alcohol or acetic acid by evaporation. A fundametal requisite to efficiency in this operation is that the air must be dispersed into very small bubbles. To attain maximum efficiency of oxygen uptake by the liquid substrate, these bubbles should be provided with a path through the liquid which is as long as possible and substantially uninterrupted by any solid surface or object, since the presence of such obstructions will cause coalescence of minute bubbles to form large ones before their passage through the liquid substrate has been completed.

In small laboratory or pilot plant apparatus this condition may readily be met by the use of air dispersion devices made of porous materials such as sintered glass, Alundum, carbon or other similar material through which clean air may be pumped. Air must be supplied at a pressure sufficient to overcome the hydrostatic head of the liquid plus the capillary pressure under which the surrounding liquid tends to penetrate and fill the pores of the porous diffusing unit.

It will be obvious from the principle of capillarity that the latter increment of pressure is inversely related to the diameter of the pores and becomes substantial when the pores are of very small size. My experiments have indicated that the pressure is great enough to place some important restrictions on the size and shape of the porous diffusing unit when the pores are small enough to achieve efficient use of the air during acetification.

For example, it was found to be impractical to provide a porous diffusing plate adequate in size to substantially cover the cross-section of a reasonably large tank and thus to provide uniform aeration throughout its cross-sectional area. Porous diffuser materials commercially available are, of necessity, fragile. When made to a degree of porosity fine enough to produce very small bubbles, they cannot be made large since they will not withstanding the air pressure necessary to overcome capillarity unless heavily reinforced by some adequate rigid structure externally spanning the porous surface. The presence of such reinforcing structures is undesirable since they tend to cause coalescence of the fine bubbles emitted by the porous surface.

It is now generally recognized that the only practical method of designing fine porous diffusers of this type is to form them into tubes of moderate size or other small shapes which are compatible with the relatively low pressure limits of the material. This necessitates the use of a large number of these units manifolded together when it becomes necessary to uniformly aerate a large tank.

It will also be obvious from the laws of capillarity that in any circumstance in which air pressure applied to the porous diffusing units falls below that necessary to overcome the capillarity of the surrounding liquid, the liquid will immediately penetrate the porous surfaces under capillary pressure. Liquid thus entering the system must be expelled through the pores in a reverse direction before the diffusers will resume their effectiveness as air-dispersing units. Any solid material which may be carried into the pores by the liquid may seriously impair the efficiency of the units until such time as it can be completely removed. A majority of the alcohol-containing liquids from which vinegar is made contains substantial quantities of solids which are of such a character as to seriously interfere with the use of porous membranes, if thus permitted to penetrate the membranes.

Another difficulty attending use of such devices is that they, of necessity, act as filters to gather and retain any oil or other contaminants which may be conveyed to them by the compressed air, at least temporarily reducing their effectiveness as air dispersing devices unless they are protected with elaborate air cleaning equipment placed ahead of them in the air stream.

Another object of this invention is, therefore, to provide a method for the deep-tank production of vinegar which overcomes the disadvantages set forth above.

Other objects and advantages of this invention it is believed will be readily apparent from the following detailed description of a preferred embodiment thereof when read in connection with the accompanying drawings.

Figure 1:
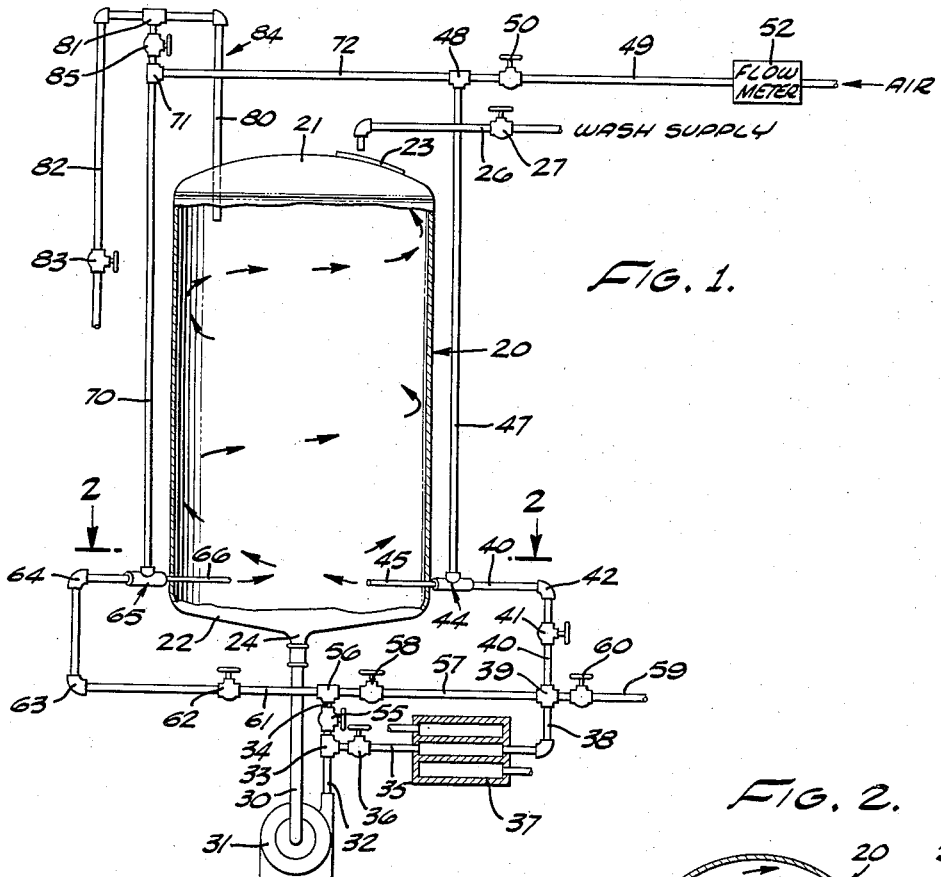
Figure 1 is a diagrammatic side elevation, illustrating the process and apparatus of this invention.

I have found that the foregoing difficulties in the aeration of deep tanks can be eliminated by the use of one or more hydraulic ejectors to gather air, compress it and disperse it in the liquid which is to be aerated. The hydraulic fluid used to actuate these ejectors is the substrate liquid itself which is pumped out of the tank and returned to the tank through the ejectors under pressure adequate to entrain the required amount of air while working against the hydrostatic head prevailing at the bottom of the tank. The entrained air is compressed at the nozzle of the ejector to the working pressure of the liquid at this point, which pressure will vary according to the operating requirements of the process, but in most instances will amount to not less than two atmospheres and may be substantially more if desired.

In accordance with well known physical laws, this compression materially increases the solubility of oxygen in the liquid. Conversely, this causes a tremendous number of fine bubbles to be formed by the air which passes out of solution as the liquid discharges from the nozzle to the lower pressure prevailing in the tank. Also, the residual entrained air not dissolved in the liquid is widely dispersed in the stream because of the turbulence of the liquid as it passes through the nozzle and throat of the ejector.

The resultant mixture of liquid, dissolved air and entrained air is discharged into the tank in such a manner that substantially all of the entrained air except that remaining in solution is dispersed in the liquid in the form of very minute bubbles, most of which are comparable in size to those obtainable with a porous diffusing unit of minimum pore size. Optimum dispersion of the air prevails at the discharge end of the ejector and, accordingly, the ejectors are arranged to discharge directly into the tank without any intervening lengths of pipe in which this optimum dispersion would be impaired.

It will thus be seen that the aeration process is benefited both by the saturation of a substantial portion of the substrate liquid with air at a pressure well above atmospheric and by the entrainment of additional air which is discharged in minute bubbles without the use of a porous device nor in fact any orifice smaller than the nozzle of a suitable ejector. Such a nozzle is, of course, vastly larger than those which are permissible in any form of porous diffuser applicable to the process. This is an important factor in the elimination of operative difficulties due to plugging of the various forms of diffusers now in use.

It will also be understood that the stream from the hydraulic ejectors when returned to the tank produces vigorous circulation of the liquid. It has been found particularly advantageous to direct the discharge from the ejector or ejectors so that it will induce rotary motion in the liquid contents of the tank. This is accomplished by the use of a cylindrical tank, vented to atmosphere, placed with its axis vertical, and provided with one or more ejectors mounted so that their discharge enters the side wall of the tank near the bottom. The stream is directed horizontally inward and tangentially to the side wall of the tank. The stream is directed inward just sufficiently off the wall of the tank to prevent impingement of the air bubbles on the side wall of the tank under the conditions of operation. This causes the liquid to rotate in the tank and the bubbles produced by the ejector or ejectors to describe a spiral path as they ascend toward the top of the liquid. This lengthens their travel and permits more of their oxygen to be dissolved than would be dissolved without such rotary motion of the liquid.

Referring now to the drawings, the apparatus of this invention includes a cylindrical tank 20, suitably supported with its axis in a vertical position and made of an acid-resistant material such as stainless steel. The tank is provided with top and bottom walls 21 and 22, the top wall having a manhole 23 and the bottom wall having a central outlet 24. The liquid to be aerated is fed to the tank through the manhole by means of supply line 26 provided with a suitable control valve 27.

The outlet 24 from the tank is connected to a down pipe 30 which leads to the intake of a positive displacement pump 31 having an outlet line 32. A T-fitting 33 is provided on the outlet line and connected thereto is a vertical pipe 34 and a horizontal line 35 which includes a valve 36 and leads to a heat exchanger 37. The outlet 38 from the heat exchanger is connected to a cross-fitting 39, the opposite side of which is connected to a line 40 including a valve 41 and an elbow-fitting 42. The horizontal portion of the line 40 leads to the intake of a hydraulic ejector 44, the tail pipe 45 of which leads directly into the tank through the tank wall. A vertical air suction line 47 is connected to the air intake of the ejector, the line 47 being connected by means of a T-fitting 48, to an air inlet line 49 provided with a valve 50 and a flow meter 52.

The upper side of the T-fitting 33 is connected through a valve 55 to a T-fitting 56. A line 57 having a valve 58 leads from one side of the fitting 56 to the cross-fitting 39 from the other side of which leads the product outlet line 59 provided with a valve 60. A line 61 leads from the other side of the fitting 56 through a valve 62 and elbows 63 and 64 to the intake of a second ejector 65 having a tail pipe 66 leading directly into the tank through the tank wall. A vertical air suction line 70 is connected to the air intake of the ejector 65, the line 70 being connected to a T-fitting 71, a horizontal pipe 72 extending between the fitting 71 and the fitting 48.

The tank is provided with gas discharge means comprising a pipe 80 extending through the top wall 21, the pipe being connected to a T-fitting 81 from which extends a gas outlet line 84 provided with a valve 83. The fittings 71 and 81 are connected together through a valve 85.

Figure 3:
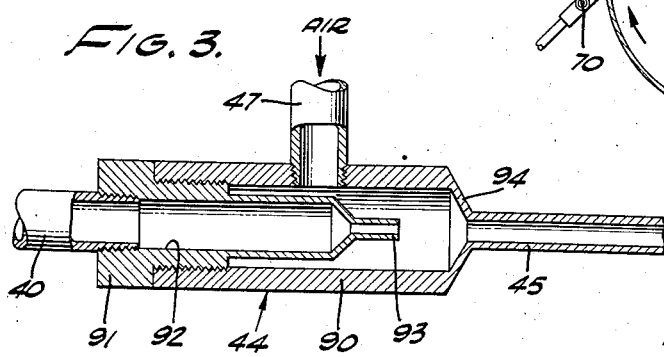
Figure 3 is a sectional elevation taken substantially on the line 3—3 of Figure 2.

The hydraulic ejectors 44 and 65 are identical and of conventional design. As shown in Figure 3, the ejector 44 comprises a generally cylindrical body 90 having a plug 91 threaded into one end, the plug having a central opening 92 to which is connected the pipe 40. Integral with the plug and extending into the body 90 is a nozzle member 93 which discharges into the ejector tail pipe 45, the body tapering into the tail pipe as at 94 to form a Venturi. The suction pipe 47 leads into the body member through a tapped opening. The principle of operation of such an ejector is well known to those skilled in the art. Basically, as the actuating liquid passes through the nozzle 93 to the Venturi the liquid undergoes a drop in pressure, thereby tending to entrain any other fluid surrounding the stream at this point, such as air from the pipe 47.

In operation of the apparatus described above, the "wash," i.e., liquid to be aerated, which in the case of vinegar manufacture is a solution containing ethyl alcohol and suitable nutrients for the growth of acetifying bacteria, is drawn from line 26 into the tank through the manhole 23. The wash from the tank flows from the outlet 24 through the line 30 and pump 31. The valves 55, 60 and 85 are initially closed and the valves 36, 41, 50, 58, 62 and 83 are initially open. Thus the liquid from the tank is pumped through the heat exchanger 37 and thence back into the tank through the ejectors 44 and 65. It should be here pointed out that the pump, the pipe and all fittings described above are, like the tank 20, made from acid-resisting materials.

As the liquid is thus circulated, the ejectors draw air through the suction lines 47 and 70 from the line 49, the air being entrained in the liquid and compressed by the ejectors. The air is discharged, along with the recirculated liquid, into the tank where it emerges from the tail pipes 45 and 66 in an extremely fine degree of dispersion in the liquid.

Figure 2:
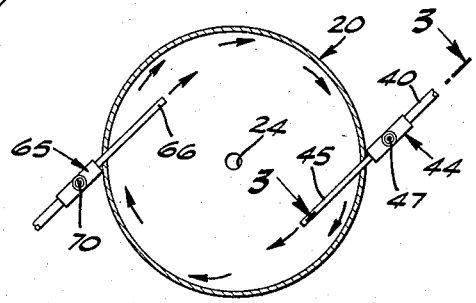
Figure 2 is a sectional elevation taken substantially on the line 2—2 of Figure 1.

As will be seen from an inspection of Figure 2, the combined velocity of the liquid and air discharged into the tanks acts in a direction tangential to the walls of the tank, thereby inducing rotary motion in the body of the liquid. Such motion permits the bubbles to describe a spiral path in reaching the surface of the liquid, thus contributing to the complete utilization of the oxygen present as the bubbles pass through the wash by increasing the distance and time of passage through the wash. The residual air passes through the pipe 80 and exhausts through the valve 83.

It is important to note that the ejector tail pipes 45 and 66 are placed so that the air bubbles discharged pass close to, but do not impinge upon, the wall of the tank. Centrifugal force in the rotating liquid causes the air bubbles to migrate toward the central axis of the tank to some extent during their upward travel. Therefore, the greatest length of travel is attained by initially bringing the air stream as close to the periphery of the tank as possible without impinging upon it. If such a stream of minute bubbles is caused to impinge upon any stationary surface in contact with the liquid, some of the bubbles will coalesce to form large bubbles at the point of impact, thereby tending to reduce the efficiency of the aeration.

As the operation has been described up to this point, the entire intake of air would be drawn in through meter 52 and the residual air after passing through the liquid would be exhausted through line 82. This adjustment applies when the requirement for oxygen is at its maximum and approaching the air capacity of the ejectors. At any time when the oxygen requirement is substantially less than this, or foam tends to appear at the outlet valve 83, increased efficiency in the conversion to acetic acid can be obtained by opening valve 85 and modulating the flow through valves 83 and 50 to cause partial or total recirculation of the air through the liquid, thereby limiting the amount of air exhausted through valve 83 to air which is freed of entrained foam and substantially depleted in oxygen by repeated passage through the wash or as nearly so as is consistent with the rate of acetification desired. Such modulation of the air supply provides an important saving in the amount of entrained liquid and volatile components (alcohol and acetic acid) carried away with the air passing out of the generator.

Such modulation of the air supply also makes it entirely possible to effectively use condensers (not shown) to further reduce the quantity of volatile substances carried out by the escaping air. Such recovery is difficult and uneconomical when applied to conventional packed generators because of the large amount of air which is normally passed through them to accomplish acetification within the time limits of good commercial practice.

Analysis of the residual air escaping from the generators at the valve 83 may be made to determine the efficiency with which the oxygen is being utilized and guide the modulation above described. The heat exchanger 37 is provided in the fluid circulation line for the purpose of modulating the temperature of the liquid in process whenever it be found to be above or below the optimum temperature for the process. Such modulation may be needed because of the ambient temperature or because of exothermic reactions involved in the process of acetic fermentation.

Since many of the alcohol bearing liquids which are used in the manufacture of vinegar tend to foam when vigorously aerated, foam-control is frequently necessary to the efficient use of the herein described apparatus. It is, in fact, a well-known requisite to many problems involving aeration. It has been found that such control is readily achieved as a collateral effect of setting the apparatus in a manner designed to cause partial or total recirculation of air, as described above.

When operating with this setting, it will be seen that whenever foam reaches the level of the lower end of pipe 80, it is sucked up in the air stream and discharged back into the batch through the ejector 44 and 65, thereby avoiding loss incident to the discharge of foam at the air outlet. It has also been found that when foam is sucked into the nozzle of the ejector, it has the temporary effect of somewhat reducing the air input to the operation, thereby exerting a modulating effect on foam formation. In practice, this tends to effect an automatic foam-control by maintaining the batch under modulated air intake until the foam level has been lowered, whereupon the ejector no longer takes in foam and returns to its normal level of air handling capacity. Under this cycle of operation, the foaming tendency eventually subsides as the acetification cycle progresses. The need for accessory mechanical devices to control foam is thus avoided. Obviously, sucking foam into the air intake would not be a practical method of foam control to use on any device where mechanical air compressors of any type are used.

The following two specific examples illustrate actual experimental runs wherein fermented pineapple juice was converted to vinegar utilizing the process and apparatus of this invention. During both of these runs, the valve 83 was open and the apparatus was operated without condensing the exhaust air or recirculation of the air.

*Example 1*

Charge to tank:
   Pineapple wine 4.44% alcohol by vol. _____ 35 gal.— 50%
   Active vinegar 4.45 gm./100 cc. acetic acid _____ 35 gal.— 50%

Total wash at 2.22% alc.+2.49 gm./100 cc. acetic acid_____ 70 gal.—100%

Treatment: Aerated at rate of 7500 cc. air/min. for 43.5 hrs., while maintained at 80–90° F. (Air supplied by recirculating about 2.1 gal./min. wash through two ejectors at about 60 p.s.i.)
Yield: 70 gallons vinegar at 4.45 gm./100 cc. acetic acid and 0.25% alc. by volume.
Rate of conversion: 0.45 grain/hr.
Efficiency of alcohol to acetic acid conversion: 96.5% of stoichiometric equivalent.

*Example 2*

Charge to tank:
   Pineapple wine 5.23% alcohol_____ 49 gal.— 70%
   Inoculum (active vinegar 3.70% acetic acid) _____ 21 gal.— 30%

Total wash at 3.66% alc.+ 1.41% acetic acid _____ 70 gal.—100%

Treatment: Aerated at rate of 7000 cc. air/min. for 80.5 hrs., while maintained at 80–90° F. (Air supplied by recirculating about 2 gal./min. wash through two ejectors at 45.6 p.s.i.)
Yield: 70 gallons vinegar at 4.87% acetic acid.
Rate of Conversion: 0.429 grain/hr.
Efficiency: 92% of stoichiometric equivalent.

Having fully described my invention, it is to be understood that I do not wish to be limited to the details set

I claim:

1. In a process for producing vinegar, the steps comprising placing a liquid mixture containing alcohol and Acetobacter in a tank, continuously withdrawing a portion of the liquid from said tank to form a flowing stream, entraining air in said flowing stream so as to provide an intimate dispersion of air in the form of small bubbles in said liquid, and immediately thereafter introducing the dispersion of air and liquid under pressure into the tank below the surface of the liquid therein so as to disperse small air bubbles within the liquid in said tank.

2. In a process for producing vinegar, the steps comprising placing a liquid mixture containing alcohol and Acetobacter in a tank, continuously withdrawing a portion of the liquid from said tank, entraining air in said withdrawn portion so as to form an intimate dispersion of air in the form of small bubbles in said portion of liquid, and immediately thereafter introducing the dispersion of air and liquid tangentially into the tank below the surface of the liquid therein and at a pressure sufficient to bring about intimate mixing of said air bubbles with the liquid in the tank without coalescing of said bubbles.

References Cited in the file of this patent

UNITED STATES PATENTS

| | | |
|---|---|---|
| 1,732,921 | Bratton | Oct. 22, 1929 |
| 1,808,956 | Ketterer | June 9, 1931 |
| 2,020,850 | Myhren et al. | Nov. 12, 1935 |
| 2,389,046 | Hare | Nov. 13, 1945 |
| 2,488,812 | Galstaun et al. | Nov. 22, 1949 |
| 2,582,198 | Etheridge | Jan. 8, 1952 |
| 2,707,683 | Hromatka | May 3, 1955 |

FOREIGN PATENTS

| | | |
|---|---|---|
| 467,359 | Great Britain | June 16, 1937 |